Oct. 8, 1957 G. D. MORTIMER 2,809,136
APPARATUS AND METHOD OF PREPARING CRYSTALS
OF SILICON GERMANIUM GROUP
Filed March 10, 1954

INVENTOR
GEORGE D. MORTIMER
BY Paul S. Martin
ATTORNEY

United States Patent Office 2,809,136

Patented Oct. 8, 1957

2,809,136

APPARATUS AND METHOD OF PREPARING CRYSTALS OF SILICON GERMANIUM GROUP

George D. Mortimer, Medford, Mass., assignor to Sylvania Electric Products Inc., a corporation of Massachusetts Application March 10, 1954, Serial No. 415,371

2 Claims. (Cl. 148—1.6)

The present invention relates to semiconductor materials, particularly germanium and silicon, to the preparation thereof especially for semiconductor devices, and to apparatus useful in such preparation. While the disclosure that follows is specifically concerned with germanium, its application to silicon is self-evident. Both germanium and silicon are of the same diamond cubic lattice structure, and operate similarly as semiconductors.

In the preparation of semiconductive germanium and the fabrication of rectifiers, transistors and the like with such germanium, the present standard practice in the industry is to prepare large ingots in the form of a single crystal, suitably containing an impurity selected for imparting the desired type of conductivity. This crystal is large enough to make large numbers of dice, by slicing the single-crystal ingot, polishing and etching the slices to reduce them to wafers of desired thinness and to remove mechanically worked crystal material; and the slices are then divided into large numbers of dice by crossed cuts.

A diamond wheel or equivalent cutting device is used in order to subdivide the ingot into slices. In this one step a larger proportion of the ingot is reduced to waste than is retained in the slices. The thickness of the slices ultimately desired is of the order of .006 inch whereas the usual cut of a diamond wheel is anywhere from 12 to 20 thousandths of an inch wide. In the subsequent etching of the cut surfaces, for removal of the mechanically worked material and for further thickness reduction, there is further waste.

An important object of the present invention is to reduce this waste in the preparation of semiconductor crystal wafers. A collateral object is to prepare wafers of crystalline silicon and germanium of the desired semiconductor characteristics by new methods, and to provide suitable apparatus for such purpose.

I have observed that germanium, for example, naturally forms small flat crystals or platelets under some cooling conditions. These platelets frequently are no more than a few thousandths of an inch thick and may be many thousandths of an inch wide and still longer. Such platelets are formed, for example, when germanium solidifies out of a germanium-zinc melt. In such form their composition is usually not controlled so as to have the desired electrical properties for device manufacture, and their physical characteristics are such that they cannot be handled practically in the routine manufacture of devices. Such platelets are extremely brittle, and they are so small as to be difficult to process by the techniques used with the slices taken from ingots in conventional practice.

I have found that platelets can be used as seed crystals in a crystal-growing process to yield large thin strips and of the desired composition. By disposing the crystal in proper relation to a melt of germanium of the desired composition, a long thin band of germanium can be pulled or grown as a single-crystal extension of a properly prepared and oriented seed.

Germanium has a natural tendency to form thin, flat crystals under certain conditions. This natural process can be encouraged and utilized in a modification of the usual crystal pulling process which heretofore has yielded large roughly cylindrical rods or bars. The large "pulled" wafer-thin crystal thus obtained is utilized in device manufacture in lieu of the slices ordinarily taken from large crystals pulled in the conventional manner. This avoids the waste incurred in the slicing and heavy etching processes heretofore involved in utilizing conventional pulled crystals for device manufacture.

The nature of the invention and further aspects of novelty and features thereof will be better appreciated from the following detailed, illustrative disclosure. In this disclosure the accompanying drawings are referred to, wherein.

Figure 3:
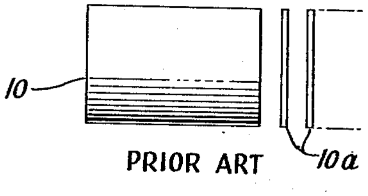
Fig. 3 is a diagrammatic view of a crystal as it is produced and utilized in accordance with previous practice.

In Fig. 3 there is shown a crystalline ingot which is usually of roughly cylindrical form. It is commonly pulled vertically from a melt of the proper composition. This may be virtually pure germanium together with a "doping" constituent only sufficient in concentration to give the desired resistivity and of a type to impart the desired type of conductivity. Either n-type or p-type semiconductive germanium is thus obtained, depending upon whether there is a predominant trace of an element from group V–B or group III–B in the melt.

It is desirable in the manufacture of devices from such crystalline material, that the crystal orientation should be uniform, in order that the various subsequent processing steps may have uniform effect and that the resulting devices may be uniform in characteristics. Crystal 10 is conventionally subdivided into slabs 10*a*, as indicated in Fig. 3, by means of a diamond wheel. This cutting wheel may be anywhere from 12 to 20 thousandths of an inch thick, and sometimes thicker, whereas slices only .006 inch may be desired. Consequently the material removed by the diamond wheel exceeds in volume the amount of material utilized in slices 10*a*. The surfaces of these slices are thereafter etched to remove mechanically worked material. Moreover, in making certain types of devices, even thinner wafers may be needed. In making alloy junction transistors, for example, wherein rectifying dots are applied to opposite faces of a very thin wafer, the slices may be further reduced in thickness, by lapping and etching.

Germanium is a rare, costly material, extremely costly by the time it has reached the processed state of a large semiconductive crystal 10. The price of this material in this state is now much higher than gold, and since as much as 70% of the crystal 10 is virtually destroyed in the sawing operation, the cost of the material remaining in slices 10*a* is considerably increased.

Figure 4:
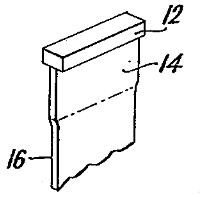
Fig. 4 is a portion of a semiconductor wafer produced in the apparatus of Figs. 1 and 2.

The waste entailed by the saw cuts to produce slices 10*a* is avoided in accordance with an important aspect of the present invention by initially pulling large crystals of thin, strip or sheet-like form, in place of the ingot 10 of heavy cross section. In Fig. 4 a mechanical support 12 is shown which is welded to thin, flat seed crystal 14 of germanium. This may be taken from a previous cycle of operations. Such a platelet initially may be produced variously, in very small sizes, as when germanium segregates out of a molten zinc melt, or it may be deliberately sawed from a large crystal with orientation determined by X-ray examination. Seed crystal 14 is utilized to pull a large thin single crystal, of considerable width and length, depending upon the pulling apparatus and pulling conditions. The extension 16 grows on the seed crystal 14 under proper conditions.

This crystal growth is promoted by orienting seed 14 with a (112) crystalline axis perpendicular to the surface of the melt from which the crystal is being pulled.

Figure 1:
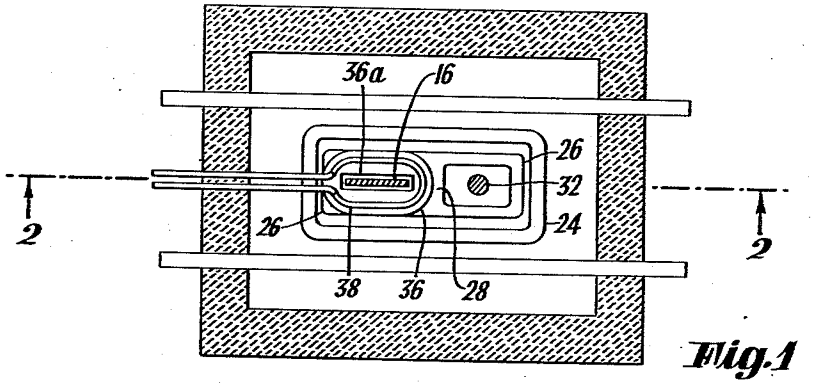
Fig. 1 is a somewhat schematic plan view, with portions removed and shown in section of a novel furnace suitable for producing wafers of semiconductor material.
Figure 2:
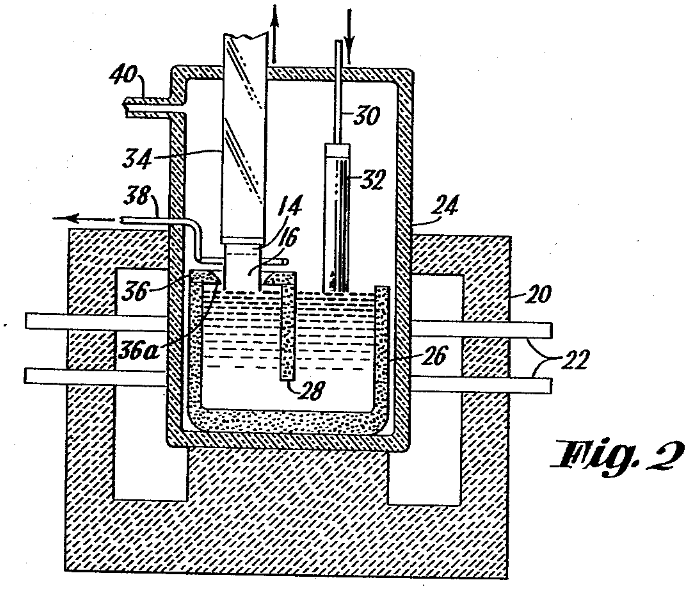
Fig. 2 is a vertical cross section of such furnace along the 2—2 in Fig. 1.

In Figs. 1 and 2, a furnace is diagrammatically illustrated that is suitable for pulling crystals of this form. Such furnace includes a chamber 20 formed of fire brick, for example, to enclose a volume that is as nearly uniform in temperature as practical. The furnace includes a number of rod heating elements 22 which are connected to an electrical supply, not shown. Within chamber 20 is quartz chamber 24 containing a graphite crucible 26. A septum of graphite 28 divides crucible 26 into two sections, interconnected at the lower edge of the divider. A rod 30 extends through the top of chamber 24, and carries a rod 32 of germanium having the desired impurity content. A band 34 (corresponding to support 12 of Fig. 4) extends upward through the top of chamber 24. Seed 14 and growing crystal 16 depend from this band 34.

As crystal 16 grows, removing material from the melt, rod 30 is lowered at a rate to maintain the surface level constant. (Suitable mechanisms (not shown) may be used for moving rod 30 and band 34 at appropriate rates.) If the volume of the crucible is large, so that the level of the melt can be considered constant despite removal of material from the melt by growing crystal 14, septum 28 and rods 30 and 32 may be omitted. These may also be omitted if the cover 36 (below) is movable relative to the crucible to retain constant spacing from the melt as the surface of the melt drops.

A graphite cover 36 rests on crucible 28, extending to septum 28. This cover has a long and narrow slot 36*a* through which crystal 16 emerges. Cover 36 surrounds the crystal and is quite close to the solid-liquid interface of crystal 16 and the melt in the crucible. Above cover 36 is a radio frequency induction coil 38, energized by an RF supply (not shown) which is effective to induce current in cover 36. The cross-section of conductive cover 36 may be varied from point to point about crystal 16 to vary its resistance and thus vary the amount of induction heating in the cover that is developed from point to point. A cooling atmosphere of a suitable preferably inert gas is supplied via inlet tube 40, and leaves the chamber by way of outlet passages not designated in the drawing.

By empirically controlling the heating and cooling system thus described a uniform temperature may be established at the sides of crystal 16 where it merges with the melt in crucible 28, inducing growth of a crystal in wafer or strip form. With a thin germanium seed with a (112) axis perpendicular to the surface of the melt, such thin, flat crystal naturally tends to grow.

The large thin crystal material thus produced is uniform in orientation and is suitable in form and composition for use in semiconductor translators of all kinds, following known processes and with known forms and arrangements of ohmic and rectifying connections.

The foregoing description of apparatus and methods of preparing crystals is intended to be illustrative, since many variations will be readily apparent. Thus, by periodically reversing the predominant impurity in the melt, the grown crystal will not be homogeneous as described but will, instead, have many rectifying junctions. Other modifications and varied applications will occur to those skilled in the art. Consequently the appended claims should be broadly construed, consistent with the spirit and scope of the invention.

What is claimed is:

1. Apparatus for preparing a thin, flat single crystal including a crucible, first heating means for maintaining the contents thereof in molten state, a support for pulling a crystal from the melt in the crucible, an electrically conductive cover for said crucible mounted above and in spaced relation but close to the surface of said melt, said cover being apertured to define a short passage of long and narrow cross-section for continuous movement of said crystal therethrough, second means adjacent said cover for inductively heating said cover and the zone defined by said passage, and means for maintaining substantially constant the closely spaced relation of the surface of the melt to the cover.

2. The method of preparing a thin flat single crystal of the silicon-germanium group including the steps of maintaining a melt of the crystal material at a temperature above its melting point, supplying heat to a heating element defining a long and narrow zone located and maintained at a predetermined distance closely above and parallel to the surface of said melt thereby to maintain a substantially uniform temperature around the sides of said zone, placing a flat seed crystal of the material edgewise in contact with the surface of said melt below said zone and raising said seed as the crystal material solidifies and adheres to said seed so that said seed and the crystal material adherent thereto pass centrally through said zone in spaced relation to said heating element.

References Cited in the file of this patent

UNITED STATES PATENTS

| | | |
|---|---|---|
| 1,088,171 | Pehrson | Feb. 24, 1914 |
| 2,569,150 | Brennan | Sept. 25, 1951 |
| 2,651,831 | Bond | Sept. 15, 1953 |
| 2,667,673 | Harrison | Feb. 2 1954 |
| 2,683,676 | Little et al. | July 13, 1954 |
| 2,686,212 | Horn | Aug. 10, 1954 |

OTHER REFERENCES

Holden: Transactions of the American Society for Metals, vol. 42, 1950, pages 321, 322.